United States Patent
Terashima et al.

(10) Patent No.: US 7,006,548 B1
(45) Date of Patent: *Feb. 28, 2006

(54) EXCIMER LASER DEVICE AND GAS FOR EXCIMER LASER

(75) Inventors: Katsutomo Terashima, Oyama (JP); Akira Sumitani, Isehara (JP); Eiji Sunaka, Hiratsuka (JP)

(73) Assignee: Komatsu Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/434,024

(22) Filed: Nov. 4, 1999

(30) Foreign Application Priority Data

Nov. 9, 1998 (JP) ................................. 10-317692

(51) Int. Cl.
H01S 3/223 (2006.01)
(52) U.S. Cl. .............................. 372/60; 372/55; 372/57
(58) Field of Classification Search .................. 372/55, 372/57, 59, 60
See application file for complete search history.

(56) References Cited

U.S. PATENT DOCUMENTS

| | | | |
|---|---|---|---|
| 3,829,551 A * | 8/1974 | Stein ........................... | 423/210 |
| 5,090,020 A | 2/1992 | Bedwell | |
| 5,307,364 A | 4/1994 | Turner | |
| 5,450,436 A | 9/1995 | Mizoguchi et al. | |
| 5,463,650 A | 10/1995 | Ito et al. | |
| 5,642,374 A * | 6/1997 | Wakabayashi et al. ......... | 372/57 |
| 5,982,800 A * | 11/1999 | Ishihara et al. ............... | 372/57 |
| 6,014,398 A * | 1/2000 | Hofmann et al. ............. | 372/57 |
| 6,018,537 A | 1/2000 | Hofmann et al. | |
| 6,130,904 A * | 10/2000 | Ishihara et al. ............... | 372/59 |
| 6,188,710 B1 * | 2/2001 | Besaucele et al. ............ | 372/60 |
| 6,490,307 B1 * | 12/2002 | de Mos et al. ............... | 372/59 |

OTHER PUBLICATIONS

R. S. Taylor et al., Transmission Properties of Spark Preionization Radiation in Rare-gas Halide Laser Gas Mixes, IEEE Journal of Quantum Electronics, Dec. 1995. IEEE, USA, vol. 31, No. 12, pp. 2195-2207.

* cited by examiner

Primary Examiner—Minsun Oh Harvey
Assistant Examiner—Cornelius H. Jackson
(74) Attorney, Agent, or Firm—Posz Law Group, PLC

(57) ABSTRACT

Burst and spike characteristics in an excimer laser output in a burst operation are efficiently improved. Xenon gas is added from a compact Xe gas cylinder to gases for excimer laser in a chamber supplied from an Ar/Ne gas cylinder and an Ar/F2/Ne gas cylinder, a ratio of the xenon gas is detected by an Xe gas sensor, and the supply of the xenon gas from the Xe gas cylinder to the chamber is controlled by a gas controller.

13 Claims, 6 Drawing Sheets

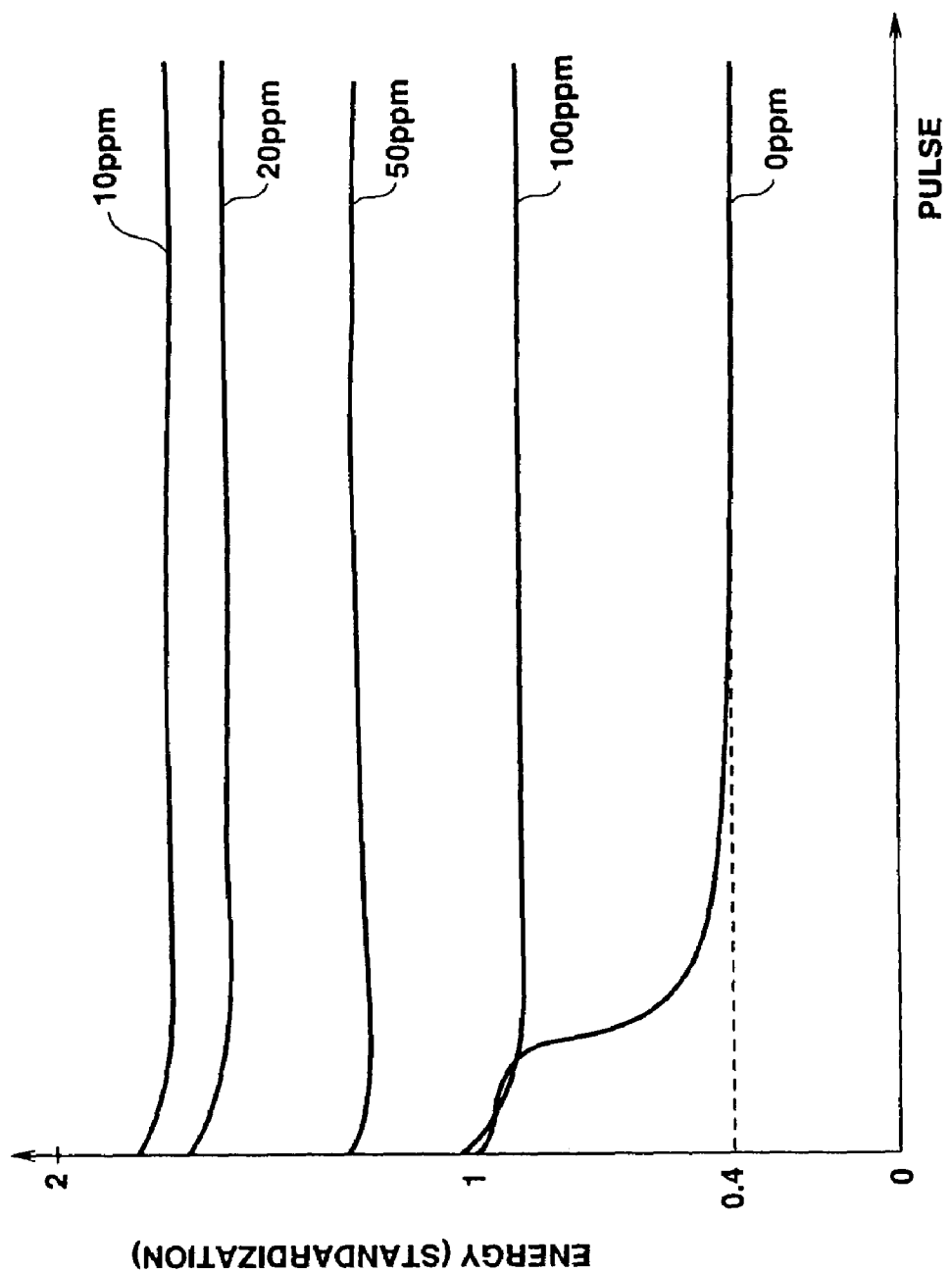

(PRIOR ART)

EXCIMER LASER DEVICE AND GAS FOR EXCIMER LASER

BACKGROUND OF THE INVENTION

1. Field of the Invention

The present invention relates to an excimer laser device in which gas for excimer laser is sealed in a chamber, pulse oscillation is carried out in the chamber to excite the gas for the excimer laser so to oscillate the pulsed laser, and gas for excimer laser, and more particularly to an excimer laser device which improves a burst phenomenon and a spiking phenomenon of a laser output by adding xenon gas, and gas for excimer laser.

2. Description of the Related Art

Conventionally, a semiconductor exposure device provided with an excimer laser device as a light source alternately repeats the exposure and the movement of the stage to expose an IC chip on a semiconductor wafer to light, so that the excimer laser device performs a burst operation which repeats a continuous pulse oscillating operation for continuously oscillating a pulse of laser light for a predetermined number of times and a suspension of oscillation for suspending the pulse oscillation for a predetermined duration.

FIG. 6(a) is a diagram showing a relation between energy and a burst number when the burst operation is performed by a conventional excimer laser device. It is seen that the burst operation of the excimer laser device has a characteristic (hereinafter called the burst characteristic) that energy is high at first and lowers gradually.

FIG. 6(b) is a diagram showing a relation between a pulse and energy at each burst. It is seen that the continuous pulse oscillating operation has a characteristic (hereinafter called the spike characteristic) that energy is relatively high at the beginning and then pulse energy lowers gradually.

Thus, when the existing excimer laser device is used to perform the burst operation, the burst characteristic and the spike characteristic are demonstrated generally.

But, the occurrence of the burst characteristic in the laser output by the excimer laser device had a drawback of causing variations in an amount of light exposure due to variations in energy at each burst.

There was also a drawback that when the spike characteristic was caused in the laser output, accuracy of the amount of light exposure was further lowered, so that it was necessary to make complex discharge voltage control.

Specifically, the discharging voltage was conventionally changed for each pulse by lowering the discharging voltage (charging voltage) of the initial pulse of the continuous pulse oscillation in the burst mode and gradually increasing the following discharging voltage of the pulse, thereby preventing the initial energy increase due to the spiking phenomenon. Therefore, complex control of the discharging voltage was necessary.

Thus, in performing the burst operation of the excimer laser device, it was a very significant issue to efficiently remedy the burst characteristic and the spike characteristic of the laser output.

"Transmission Properties of Spark Preionization Radiation in Rare-Gas Halide Laser Gas Mixes" disclosed in "IEEE JOURNAL OF ELECTRONICS, VOL. 31, No. 12, December 1995, p2195–p2207" suggests a technology of adding xenon gas to neon gas alone. But, this conventional technology is a technology just to increase the spark preionization but not to remedy the burst characteristic and the spike characteristic of the excimer laser output.

SUMMARY OF THE INVENTION

It is an object of the present invention to provide an excimer laser device, which can efficiently improve burst and spike characteristics of an excimer laser output in burst operation, and gas for excimer laser.

In order to achieve the aforesaid object, a first aspect of the invention relates to an excimer laser device in which gas for excimer laser is sealed in a means and the control means to a conventional excimer laser device because the concentration of the xenon gas added to the gas for excimer laser in the chamber is detected, and the supply amount of the xenon gas sealed in the xenon gas cylinder to the chamber is controlled according to the detected concentration of the xenon gas.

The third aspect of the invention relates to gas for excimer laser used for an excimer laser device which oscillates pulsed laser by exciting gas for excimer laser sealed in a chamber, wherein the gas for excimer laser contains at least a predetermined concentration of xenon gas.

Thus, the third aspect is configured to contain at least the predetermined concentration of xenon gas in addition to halogen gas in the gas for excimer laser, so that the excimer laser output can be readily improved and the output can be stabilized by merely supplying the gas for excimer laser into the chamber.

The fourth aspect of the invention relates to gas for excimer laser which contains 200 ppm or below of the xenon gas.

BRIEF DESCRIPTION OF THE DRAWINGS

FIG. 5 is a diagram showing a correlation between an amount of xenon added to gas for excimer laser and a spike characteristic;

DESCRIPTION OF THE PREFERRED EMBODIMENTS

An embodiment of the invention will be described with reference to the accompanying drawings.

Figure 1:
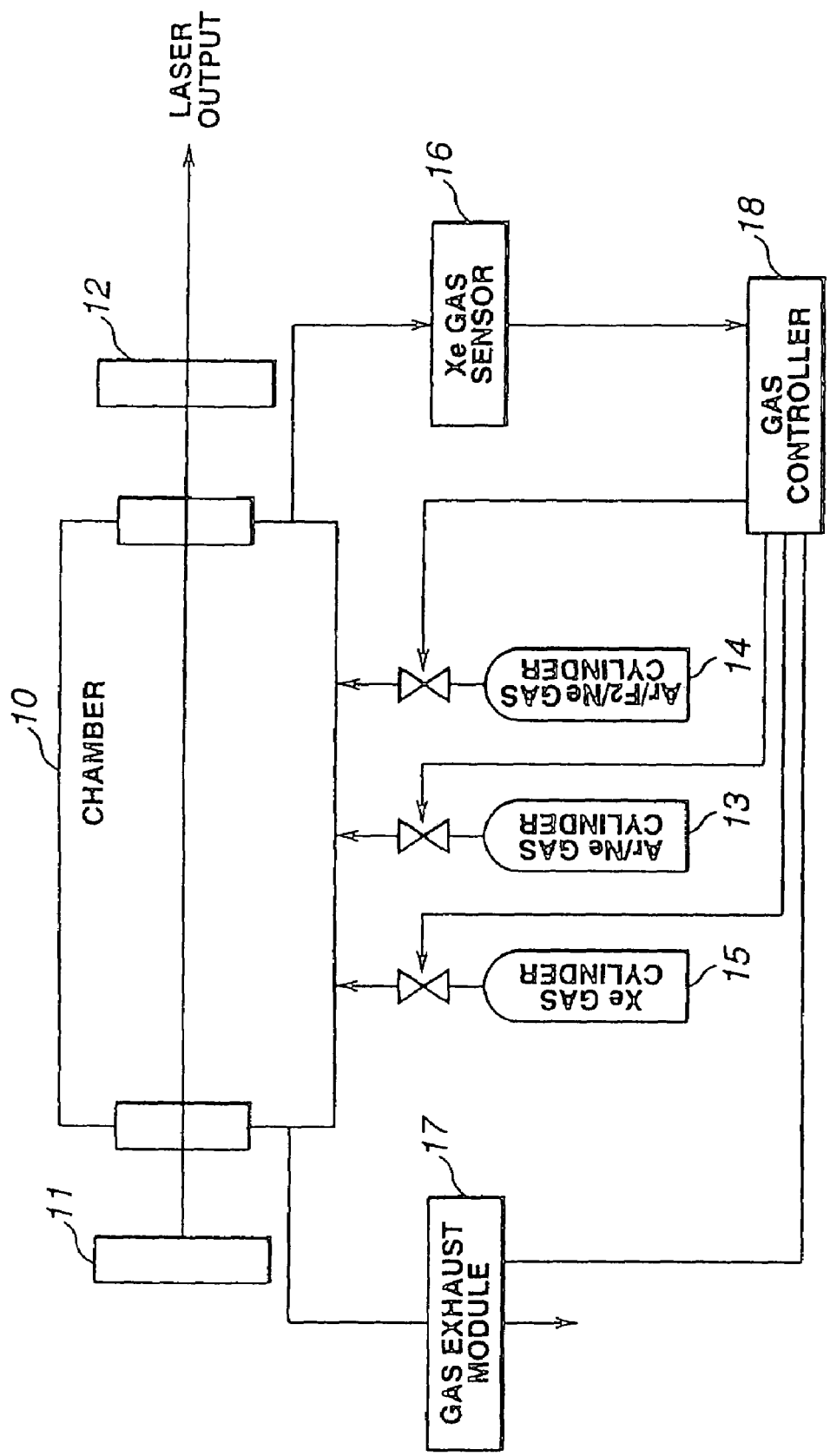
FIG. 1 is a block diagram showing a structure of an excimer laser device used in an embodiment of the invention.

FIG. 1 is a block diagram showing the structure of the excimer laser device used in the embodiment of the invention.

The excimer laser device shown in FIG. 1 is a device which has gas for excimer laser, which is composed of buffer gas such as Ne, rare gas such as Ar or Kr, halogen gas such as $F_2$ and xenon (Xe) gas, sealed into chamber 10 and excites the gas for excimer laser by the electrical discharge across discharging electrodes to carry out pulse laser oscillation.

This excimer laser device has a feature of adding xenon gas to the gas for excimer laser instead of preparing the excimer laser gas from only buffer gas and halogen gas different from a conventional way. The xenon gas was added to the gas for excimer laser in order to remedy a burst phenomenon and a spiking phenomenon which are caused in the excimer laser output.

The excimer laser device of FIG. 1 has the chamber 10, narrow-band making unit 11, partial penetration mirror 12, Ar/Ne gas cylinder 13, Ar/F2/Ne gas cylinder 14, Xe gas cylinder 15, Xe gas sensor 16, gas exhaust module 17 and gas controller 18.

The chamber 10 is a sealing medium for sealing the gas for excimer laser prepared by mixing Ne, Ar, F2 and Xe gases, and the narrow-band making unit 11 is a unit for making emitted pulse light to have a narrow band and comprises prism beam expander and grating (not shown). And, the partial penetration mirror 12 is a mirror for making penetration output of only a part of the oscillated laser light.

The Ar/Ne gas cylinder 13 is a gas cylinder for storing a mixture gas of argon and neon, the Ar/F2/Ne gas cylinder 14 is a gas cylinder for storing a mixture gas of argon, neon and fluorine, and the Xe gas cylinder 15 is a compact gas cylinder for storing xenon gas.

The Xe gas sensor 16 is a gas sensor for detecting a ratio of xenon gas or the like contained in the gas for excimer laser sealed into the chamber 10, and the gas exhaust module 17 is a module externally discharging the excimer laser gas from the chamber 10.

The gas controller 18 is a controller which controls based on the detection output of the Xe gas sensor 16 the supply of Ar/Ne gas from the Ar/Ne gas cylinder 13 to the chamber 10, the supply of Ar/F2/Ne gas from the Ar/F2/Ne gas cylinder 14 to the chamber 10, the supply of xenon gas from the Xe gas cylinder 15 to the chamber 10, and the exhaust of the gas for excimer laser by the gas exhaust module 17.

Thus, this excimer laser device is configured by mounting the compact Xe gas cylinder 15 to a conventional excimer laser device, detects a ratio of xenon gas by the Xe gas sensor 16, and controls the supply of xenon gas from the Xe gas cylinder 15 to the chamber 10 by the gas controller 18.

The burst characteristic and the spike characteristic, when the excimer laser gas with xenon gas added is used, will be described.

FIG. 2 is a diagram showing an example of the burst characteristic and the spike characteristic when the gas for excimer laser with xenon gas added is used. In this case, 10 ppm of xenon gas was added to the gas for excimer laser.

Figure 2A:
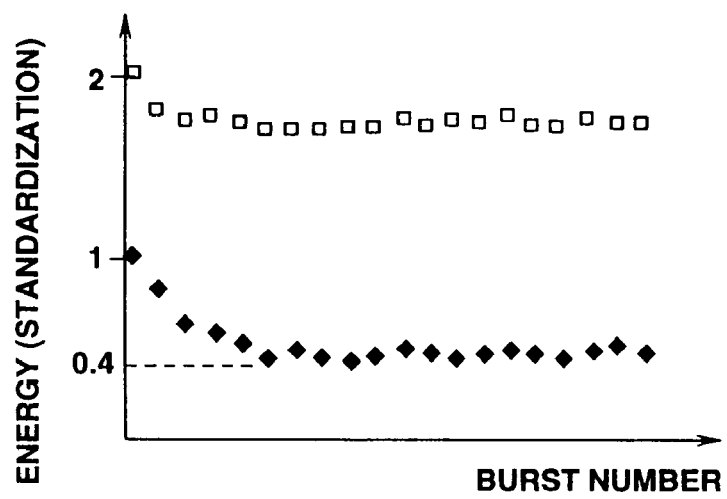
FIGS. 2(a) and 2(b) are diagrams exemplifying burst and spike characteristics when gas for excimer laser with xenon gas added is used.

As shown in FIG. 2(a), where xenon gas is not added (see the characteristic indicated at the lower part of the drawing) and an energy value of the initial burst is assumed to be 1, the burst characteristic is that the energy value becomes small as the number of times of burst increases and converges to about 40% (0.4) of the initial value.

On the other hand, where 10 ppm of xenon gas is added (see the characteristic indicated at the upper part of FIG. 2(a)), the number of times of burst until the energy value converges is small, and energy which lowers as the number of times of burst increases is small. Besides, the energy value of each burst where 10 ppm of xenon gas is added is far larger than no addition of the xenon gas.

As described above, when 10 ppm of xenon gas is added, the burst characteristic is remarkably improved as compared with no addition of the xenon gas.

Figure 2B:
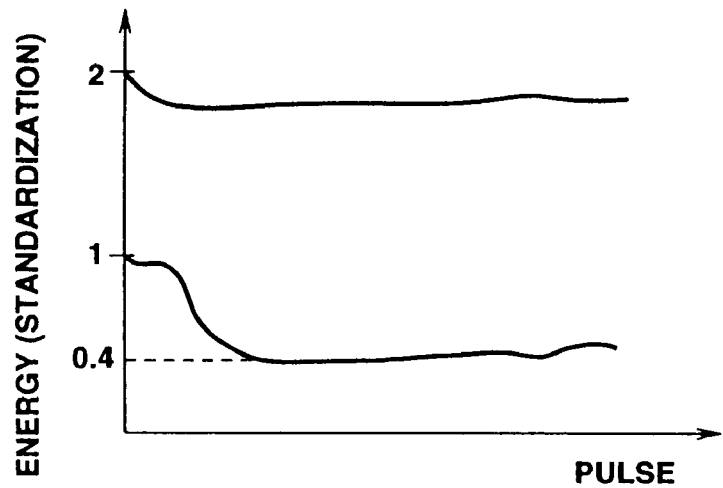

As shown in FIG. 2(b), where the xenon gas is not added (see the characteristic curve indicated at the lower part of the drawing) and an energy value of the initial burst is assumed to be 1, the spike characteristic is that the energy value becomes small as the number of times of pulsing increases and converges to about 40% (0.4) of the initial value. Therefore, the pulse in the spike portion can not be used practically until the energy converges with the progress of the pulse oscillation.

On the other hand, where 10 ppm of xenon gas is added (see the characteristic curve indicated at the upper part of FIG. 2(b)), the spike portion is substantially removed, the energy value converges very quick, and deviations ($3\sigma$) of the energy value is greatly improved. And, where 10 ppm of xenon gas is added, each pulse energy value is far larger than no addition of the xenon gas.

As described above, the addition of 10 ppm of xenon gas greatly improves the spike characteristic as compared with no addition of the xenon gas.

Now, a correlation between an amount of xenon added to the gas for excimer laser sealed in the chamber 10 shown in FIG. 1 and the energy value of laser output and its variations will be described.

Figure 3:
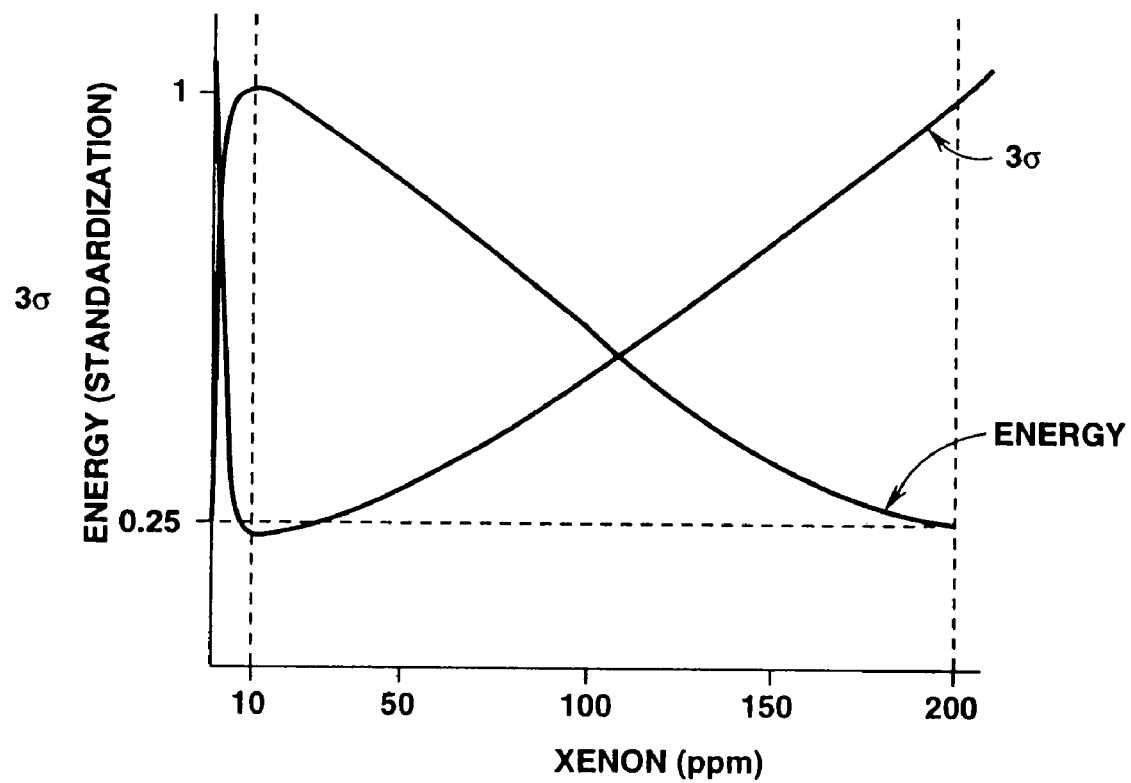
FIG. 3 is a diagram showing a correlation between an amount of xenon gas added to gas for excimer laser filled in the chamber shown in FIG. 1 and an energy value of laser output and its variations.

FIG. 3 is a diagram showing a correlation between an amount of xenon added to the gas for excimer laser sealed in the chamber 10 shown in FIG. 1 and the energy value of laser output and its variations ($3\sigma$).

As shown in FIG. 3, where xenon gas is not added, the energy value obtained is only about 25% of the maximum output obtained when it is added, but the energy value is quickly increased by gradually increasing the amount of xenon gas added (0 to 10 ppm).

Specifically, when xenon gas is added in an amount of 0 to 2 ppm, the output energy is increased rapidly, when it is added in a range of 2 to 10 ppm, the output energy is substantially flat, and when it is added in an amount of 10 ppm, the energy value becomes maximum. And, when the added amount of xenon gas is further increased, the energy value lowers gradually.

When the addition of xenon gas is gradually increased (0 to 10 ppm), the variations ($3\sigma$) of the energy value are decreased, and when its added amount becomes about 10 ppm, the variations in the energy value become minimum (about 25%). And, when the added amount of xenon gas is continuously increased, the variations ($3\sigma$) are increased.

In terms of the energy efficiency and the stability of energy, the addition of about 10 ppm of xenon gas is most efficient. But, even the addition of about 200 ppm of xenon gas can improve the energy value and its variations compared with no addition of xenon gas.

Figure 4:
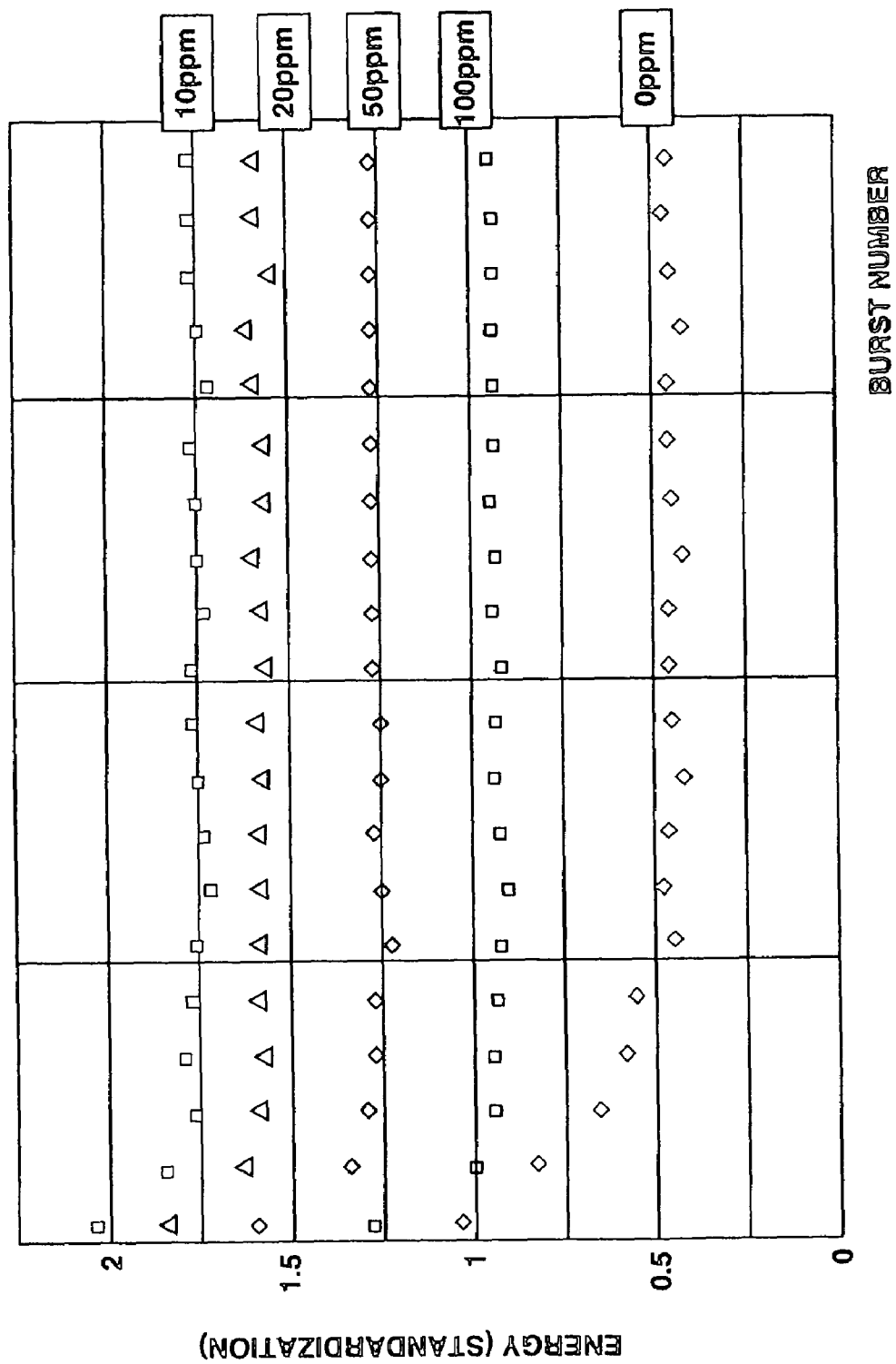
FIG. 4 is a diagram showing a correlation between an amount of xenon added to gas for excimer laser and a burst characteristic.
Figure 6A:
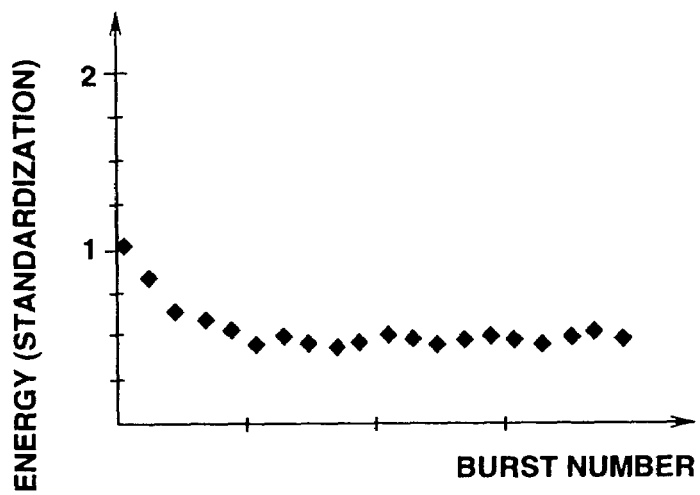
FIGS. 6(a) and 6(b) are diagrams showing a relation between energy and a burst number, etc. when a burst operation is performed by a conventional excimer laser device.
Figure 6B:
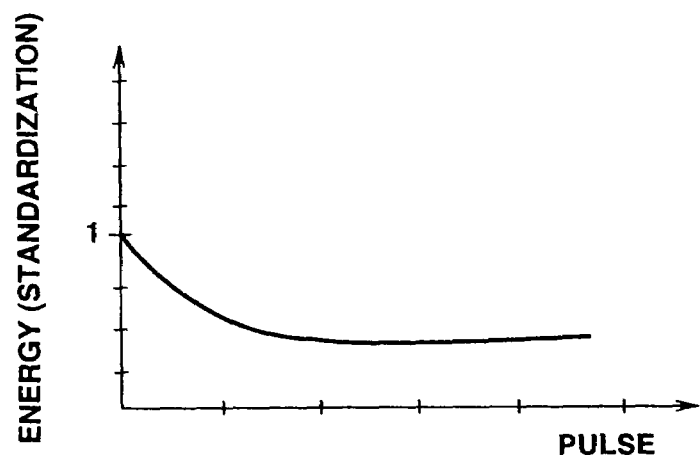

The burst characteristic and the spike characteristic with variable amounts of xenon added to the gas for excimer laser sealed into the chamber 10 of FIG. 1 will be decried with reference to FIG. 4 and FIG. 5.

FIG. 4 is a diagram showing a correlation between the amount of xenon added to the gas for excimer laser and the burst characteristic.

As shown in FIG. 4, when xenon gas is not added (0 ppm), there is caused a burst characteristic that an output light energy value is gradually lowered with the increase of the number of times of burst and converges to a certain value. When xenon gas of 10 ppm, 20 ppm, 50 ppm or 100 ppm is added, the number of times of burst until the output light energy converges is decreased.

When 10 ppm of xenon gas is added, the energy value becomes maximum, then the energy value of each burst lowers every time the added amount of xenon gas is increased. But, even when 100 ppm of xenon gas is added, the energy value of each burst is larger than no addition of xenon gas.

It is seen from the above that the burst characteristic is basically improved by adding xenon gas, and the addition of about 10 ppm of xenon gas is most efficient.

FIG. 5 is a diagram showing a correlation between the amount of xenon gas added to the gas for excimer laser and the spike characteristic.

As shown in FIG. 5, when xenon gas is not added (0 ppm), there is caused a spike characteristic that the energy value lowers gradually until a pulse exceeds a predetermined level, but when the xenon gas of 10 ppm, 20 ppm, 50 ppm or 100 ppm is added, the spike characteristic is greatly improved.

And, when 10 ppm of xenon gas is added, the energy value becomes maximum, and the pulse energy value lowers every time the added amount of xenon gas is increased. But, even when 100 ppm of xenon gas is added, the pulse energy value is larger than no addition of the xenon gas.

It is seen from the above that the spike characteristic is basically improved by adding xenon gas, and the addition of about 10 ppm of xenon gas is most efficient.

As described above, the present embodiment, which is configured by mounting the compact Xe gas cylinder 15 to a conventional excimer laser device, detects a ratio of xenon gas by the Xe gas sensor 16, and controls the supply of xenon gas from the Xe gas cylinder 15 to the chamber 10 by the gas controller 18, provides the following effects.

(1) Burst and spiking phenomena caused in the excimer laser output can be lowered.
(2) The excimer laser output can be stabilized readily without involving complex control.
(3) The excimer laser output can be stabilized with a conventional excimer laser device used as a basic structure.

In the aforesaid embodiment, the Xe gas cylinder 15 and the like were added to a conventional excimer laser device. But, the present invention is not limited to it and can also have a gas cylinder, in which the gas for excimer laser with xenon gas added is sealed, and supply the gas for excimer laser directly from the gas cylinder to the chamber 10.

What is claimed is:

1. An excimer laser comprising a chamber device, a gas mixture sealed in the chamber device, the gas mixture being composed of a rare gas selected from the group consisting of Kr and Ar, a buffer gas of Ne, and a halogen gas, gas supply means for supplying the mixture gas to the chamber device, and means for carrying out pulse oscillation in the chamber device by discharges across discharge electrodes to excite the gas mixture to oscillate a pulsed laser; wherein a predetermined amount of xenon gas having a concentration of approximately 10 ppm is supplied directly from xenon gas supply means to the gas mixture in the chamber device causing the chamber device to maximize an output energy of excimer laser and minimize a dispersion of the output energy.

2. An excimer laser according to claim 1, wherein the gas supply means includes an xenon sensor means for detecting an amount of xenon within the chamber device, and a controller for controlling the amount of xenon supplied to the chamber device based on the detected amount of xenon in the chamber device by the xenon sensor means.

3. An excimer laser according to claim 1, wherein the rare gas is Kr.

4. An excimer laser comprising a chamber device, a gas mixture sealed in the chamber device, the gas mixture being composed of a rare gas selected from the group consisting of Kr and Ar, a buffer gas of Ne, and a halogen gas, gas supply means for supplying the mixture gas to the chamber device, and means for carrying out pulse oscillation by discharges across discharge electrodes to excite the gas mixture to oscillate a pulsed laser;

wherein an amount of xenon gas is supplied from the gas supply means and previously mixed in the gas mixture and sealed into the gas supply means;

and when the gas mixture is supplied into the chamber device, the gas mixture sealed within the chamber device has a xenon concentration of approximately 10 ppm; and the xenon contained within the gas mixture maximizes an output energy of oscillated pulsed laser and minimizes a dispersion of the output energy of the oscillated pulsed laser.

5. An excimer laser according to claim 4, wherein the gas supply means includes an xenon sensor means for detecting an amount of xenon within the chamber device, and a controller for controlling the amount of xenon supplied to the chamber device based on the detected amount of xenon in the chamber device by the xenon sensor means.

6. An excimer laser according to claim 4, wherein the rare gas is Kr.

7. An excimer laser output control method used in an excimer laser, which comprises:

a step of sealing a gas mixture within a chamber device, the gas mixture including a rare gas selected from the group consisting of Kr and Ar, a buffer gas of Ne, and a halogen gas by supplying the mixture gas from gas supply means;

a xenon gas supplying step of supplying a predetermined amount of xenon gas into the chamber device in which the gas mixture was sealed, so that the gas mixture sealed in the chamber device has a xenon concentration of approximately 10 ppm; and a step of carrying out pulse oscillation in the chamber device by discharge across discharge electrodes to excite the gas mixture to oscillate pulsed laser and the xenon contained within the gas mixture maximizes an output energy of the oscillated pulsed laser and minimizes a dispersion of the output energy of the oscillated pulsed laser.

8. An excimer laser output control method according to claim 7 further comprising:

a step of sealing the xenon gas to be supplied to the chamber device to a xenon gas supply means; and a concentration sensing step of detecting the concentration of xenon gas added to the gas mixture in the chamber device, wherein during the xenon gas supplying step, a supply amount of the xenon gas sealed in the xenon gas supply means and supplied to the chamber device is controlled and the concentration of the xenon gas detected in the concentration sensing step becomes approximately 10 ppm of the gas mixture.

9. An excimer laser output control method according to claim 7, further includes a step of detecting an amount of xenon within the chamber device by xenon sensor means, and a step of supplying a controlled amount of xenon to the chamber device based on the detected amount of xenon in the chamber device by the xenon sensor means.

10. An excimer laser output control method according to claim 7, wherein the rare gas is Kr.

11. An excimer laser output control method used in an excimer laser chamber device, which comprises:

a step of preparing a gas mixture composed of a rare earth gas selected from the group consisting of Kr and Ar, a buffer gas of Ne, and a halogen gas;

a xenon gas mixing step of supplying a predetermined amount of xenon gas into the gas mixture and mixing the predetermined amount of xenon gas with the gas mixture, so that the gas mixture contains approximately 10 ppm of xenon gas;

a supply step of supplying the gas mixture containing approximately 10 ppm of xenon gas to the chamber device;

a sealing step of sealing the gas mixture containing approximately 10 ppm of xenon gas in the chamber device; and an oscillation step of carrying out pulse oscillation in the chamber device by discharge across discharge electrodes to excite the gas mixture, and the approximately 10 ppm of xenon gas in the gas mixture maximizes an output energy of oscillated pulsed laser and minimizes a dispersion of the output energy of the oscillated pulsed laser.

12. An excimer laser output control method according to claim 11, further includes a step of detecting an amount of xenon within the chamber device by xenon sensor means, and a step of supplying a controlled amount of xenon to the chamber device based on the detected amount of xenon in the chamber device by the xenon sensor means.

13. An excimer laser output control method according to claim 11, wherein the rare gas is Kr.

* * * * *